(12) United States Patent
Wang et al.

(10) Patent No.: US 11,258,119 B2
(45) Date of Patent: Feb. 22, 2022

(54) BATTERY BOX

(71) Applicant: CONTEMPORARY AMPEREX TECHNOLOGY CO., LIMITED, Ningde (CN)

(72) Inventors: Heng Wang, Ningde (CN); Jinqing Ji, Ningde (CN); Wenhui Zhang, Ningde (CN); Mu Qian, Ningde (CN); Yanhuo Xiang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 265 days.

(21) Appl. No.: 16/719,663

(22) Filed: Dec. 18, 2019

(65) Prior Publication Data

US 2020/0212523 A1 Jul. 2, 2020

(30) Foreign Application Priority Data

Dec. 29, 2018 (CN) .......................... 201822246290.4

(51) Int. Cl.
*H01M 10/6554* (2014.01)
*H01M 10/615* (2014.01)
(Continued)

(52) U.S. Cl.
CPC ..... *H01M 10/6554* (2015.04); *H01M 10/615* (2015.04); *H01M 10/617* (2015.04); *H01M 10/658* (2015.04); *H01M 10/6556* (2015.04)

(58) Field of Classification Search
CPC combination set(s) only.
See application file for complete search history.

(56) References Cited

U.S. PATENT DOCUMENTS

| 9,533,600 | B1 * | 1/2017 | Schwab | ............ | H01M 10/6554 |
| 2008/0193830 | A1 * | 8/2008 | Buck | .................. | H01M 10/658 |
| | | | | | 429/120 |

(Continued)

FOREIGN PATENT DOCUMENTS

| CN | 102347519 A | * | 2/2012 | .......... | H01M 50/543 |
| CN | 204348869 U | | 5/2015 | | |

(Continued)

OTHER PUBLICATIONS

Contemporary Amperex Technology Co., Limited, Extended European Search Report, EP19216900.1, dated May 29, 2020, 6 pgs.

(Continued)

*Primary Examiner* — Kaity V Chandler
(74) *Attorney, Agent, or Firm* — Morgan, Lewis & Bockius LLP

(57) ABSTRACT

The present disclosure provides a battery box which comprises a lower frame body and a heat exchange assembly, the heat exchange assembly comprises a heat exchange plate, a heat insulating pad, a temperature preserving pad and a protective plate. The heat exchange plate is provided with a flow passage therein; a first part of the heat insulating pad and the circumferential edge of the heat exchange plate are stacked in the up-down direction, the first part of the heat insulating pad is sandwiched between a lower surface of the lower frame body and the upper surface of the circumferential edge of the heat exchange plate; at least a portion of the temperature preserving pad is provided below the heat exchange plate. Therefore, at least the heat transfer in the upward direction between the lower frame body and the circumferential edge of the heat exchange plate is blocked.

13 Claims, 8 Drawing Sheets

(51) Int. Cl.
*H01M 10/617* (2014.01)
*H01M 10/6556* (2014.01)
*H01M 10/658* (2014.01)

(56) References Cited

U.S. PATENT DOCUMENTS

| | | | | |
|---|---|---|---|---|
| 2011/0159340 | A1* | 6/2011 | Hu | H01M 10/6555 429/120 |
| 2011/0300421 | A1* | 12/2011 | Iritani | H01M 10/6557 429/72 |
| 2013/0146249 | A1* | 6/2013 | Katayama | F28F 9/00 165/46 |
| 2014/0322563 | A1* | 10/2014 | Ketkar | H01M 10/613 429/50 |
| 2015/0340746 | A1* | 11/2015 | Origuchi | H01M 10/4207 429/9 |
| 2016/0056516 | A1* | 2/2016 | Srinivasan | B60L 50/64 429/120 |
| 2016/0064708 | A1* | 3/2016 | Miller | H01M 10/647 429/99 |
| 2016/0118701 | A1* | 4/2016 | Subramanian | H01M 10/613 429/120 |
| 2016/0133998 | A1* | 5/2016 | Masias | H01M 10/6567 429/10 |
| 2016/0141737 | A1* | 5/2016 | Kubota | H01M 10/0481 429/120 |
| 2016/0308262 | A1* | 10/2016 | Masias | B60L 58/26 |
| 2018/0123192 | A1* | 5/2018 | Fees | H01M 10/6554 |
| 2018/0131051 | A1* | 5/2018 | Paramasivam | H01M 10/6556 |
| 2018/0212222 | A1* | 7/2018 | Barton | H01M 50/3425 |
| 2018/0287227 | A1* | 10/2018 | Jeong | H01M 50/24 |
| 2019/0379094 | A1* | 12/2019 | Kim | H01M 10/0486 |
| 2020/0091479 | A1* | 3/2020 | Fees | H01M 10/6567 |
| 2020/0212523 | A1* | 7/2020 | Wang | H01M 10/617 |

FOREIGN PATENT DOCUMENTS

| | | |
|---|---|---|
| CN | 205211817 U | 5/2016 |
| CN | 207021300 U | 2/2018 |
| CN | 207183375 U | 4/2018 |
| CN | 207183375 U | 4/2018 |
| CN | 207676971 U | 7/2018 |
| CN | 108365156 A | 8/2018 |
| CN | 207818674 U | 9/2018 |
| CN | 209401679 U | 9/2019 |
| JP | 2014183013 A | 9/2014 |

OTHER PUBLICATIONS

Contemporary Amperex Technology Co., Limited, International Search Report and Written Opinion, PCT/CN2019/125998, dated Mar. 18, 2020, 13 pgs.

* cited by examiner

BATTERY BOX

CROSS-REFERENCE TO RELATED APPLICATIONS

The present application claims priority to Chinese patent application No. CN201822246290.4, filed on Dec. 29, 2018, which is incorporated herein by reference in its entirety.

TECHNICAL FIELD

The present disclosure relates to the field of battery, and particularly relates to a battery box.

BACKGROUND

In the field of battery, a battery box comprises a lower frame body and a heat exchange plate, the lower frame body and the heat exchange plate form an accommodating space for accommodating a battery module, the battery module comprises a plurality of arranged batteries, the battery module is supported on the heat exchange plate, the heat exchange plate supports the batteries and exchanges heat with the batteries.

The battery generally needs to maintain at a constant temperature range to ensure the stability and constancy of the operating temperature of the battery.

However, because the heat exchange plate is fixed to the lower frame body, there is heat transfer between the heat exchange plate and the lower frame body, which will affect the heat exchange effect of the heat exchange plate and the stability and constancy of the operating temperature of the battery.

SUMMARY

In view of the problem existing in the background, an object of the present disclosure is to provide a battery box, which blocks the heat transfer in an upward direction between the lower frame body and an upper surface of a circumferential edge of the heat exchange plate, thereby improving the heat insulating effect to the heat exchange plate, and in turn improving the stability and constancy of the operating temperature of the battery.

In order to achieve the above object, the present disclosure provides a battery box, which comprises: a lower frame body closed in a circumferential direction and opened in an up-down direction; and a heat exchange assembly fixed below the lower frame body at a circumferential edge of the heat exchange assembly, the heat exchange assembly and the lower frame body form an accommodating space which is opened upwardly and used to accommodate a battery, the heat exchange assembly comprises a heat exchange plate, a heat insulating pad, a temperature preserving pad and a protective plate; wherein the heat exchange plate is provided with a flow passage therein for a heat exchange medium to flow, a portion of the heat exchange plate provided with the flow passage is used to support the battery and exchange heat with the battery; the heat insulating pad comprises a first part, the first part has a ring shape, the first part surrounds an entire circumferential edge of the heat exchange plate outside the flow passage and is provided above an upper surface of the circumferential edge of the heat exchange plate, the first part of the heat insulating pad and the circumferential edge of the heat exchange plate are stacked in the up-down direction, the first part of the heat insulating pad is sandwiched between a lower surface of the lower frame body and the upper surface of the circumferential edge of the heat exchange plate; at least a portion of the temperature preserving pad is provided below the heat exchange plate, and the temperature preserving pad at least covers the portion of the heat exchange plate in which the flow passage is provided; the protective plate supports the temperature preserving pad and the heat exchange plate from below.

In an embodiment, the protective plate comprises a peripheral portion which is ring-shaped and a recessed portion which is recessed downwardly from an inner side of the peripheral portion, the temperature preserving pad is received in the recessed portion; the first part of the heat insulating pad, the circumferential edge of the heat exchange plate and the peripheral portion of the protective plate are stacked in the up-down direction; an outer side surface of the first part of the heat insulating pad, an outer side surface of the circumferential edge of the heat exchange plate and an outer side surface of the peripheral portion of the protective plate are flush with each other.

In an embodiment, the protective plate comprises a peripheral portion which is ring-shaped and a recessed portion which recessed downwardly from an inner side of the peripheral portion, the temperature preserving pad is received in the recessed portion; an outer side surface of the peripheral portion of the protective plate protrudes outwardly with respect to an outer side surface of the circumferential edge of the heat exchange plate; the heat insulating pad further comprises a second part, the second part bends downwardly from the first part and extends to surround the outer side surface of the circumferential edge of the heat exchange plate from outside.

In an embodiment, the heat insulating pad further comprises a third part; the third part bends inwardly from the second part and extends to below a lower surface of the circumferential edge of the heat exchange plate, the third part is sandwiched by an upper surface of the peripheral portion of the protective plate and the lower surface of the circumferential edge of the heat exchange plate in the up-down direction.

In an embodiment, the heat insulating pad further comprises a third part, the third part bends inwardly from the second part, extends to below a lower surface of the circumferential edge of the heat exchange plate and further extends into the recessed portion of the protective plate; the temperature preserving pad comprises a main body and a protruding portion which is ring-shaped and protrudes upwardly from the main body, and the protruding portion and a portion of the third part which is located in the recessed portion of the protective plate abut against each other in the up-down direction.

In an embodiment, the protective plate comprises a peripheral portion which is ring-shaped and a recessed portion which is recessed downwardly from an inner side of the peripheral portion; the temperature preserving pad comprises a main body and an extending portion, the main body is received in the recessed portion, the extending portion extends outwardly from the main body onto an entire lower surface of the circumferential edge of the heat exchange plate so that the extending portion is sandwiched between an upper surface of the peripheral portion of the protective plate and the lower surface of the circumferential edge of the heat exchange plate.

In an embodiment, the protective plate comprises a peripheral portion which is ring-shaped and a recessed portion which recessed downwardly from an inner side of the peripheral portion; an outer side surface of the peripheral portion of the protective plate protrudes outwardly with respect to an outer side surface of the circumferential edge of the heat exchange plate; the temperature preserving pad comprises a main body, an extending portion and a bending portion, the main body is received in the recessed portion, the extending portion extends outwardly from the main body onto a lower surface of the circumferential edge of the heat exchange plate so that the extending portion is sandwiched between an upper surface of the peripheral portion of the protective plate and the lower surface of the circumferential edge of the heat exchange plate, the bending portion bends upwardly from the extending portion and extends to surround the outer side surface of the circumferential edge of the heat exchange plate.

In an embodiment, the temperature preserving pad further comprises a folding-back portion, the folding-back portion bends inwardly from the bending portion and extends to the upper surface of the circumferential edge of the heat exchange plate.

In an embodiment, the folding-back portion of the temperature preserving pad is sandwiched between the first part of the heat insulating pad and the upper surface of the circumferential edge of the heat exchange plate.

In an embodiment, the first part of the heat insulating pad is sandwiched between the folding-back portion of the temperature preserving pad and the upper surface of the circumferential edge of the heat exchange plate.

In an embodiment, the temperature preserving pad and the heat insulating pad are integrally formed.

The present disclosure has the following beneficial effects: by the arrangement of the first portion of the heat insulating pad, the heat transfer in the upward direction between the lower frame body and the upper surface of the circumferential edge of the heat exchange plate is blocked, which improves the heat insulating effect to the heat exchange plate, and in turn improves the stability and constancy of the operating temperature of the battery.

Figure 1:
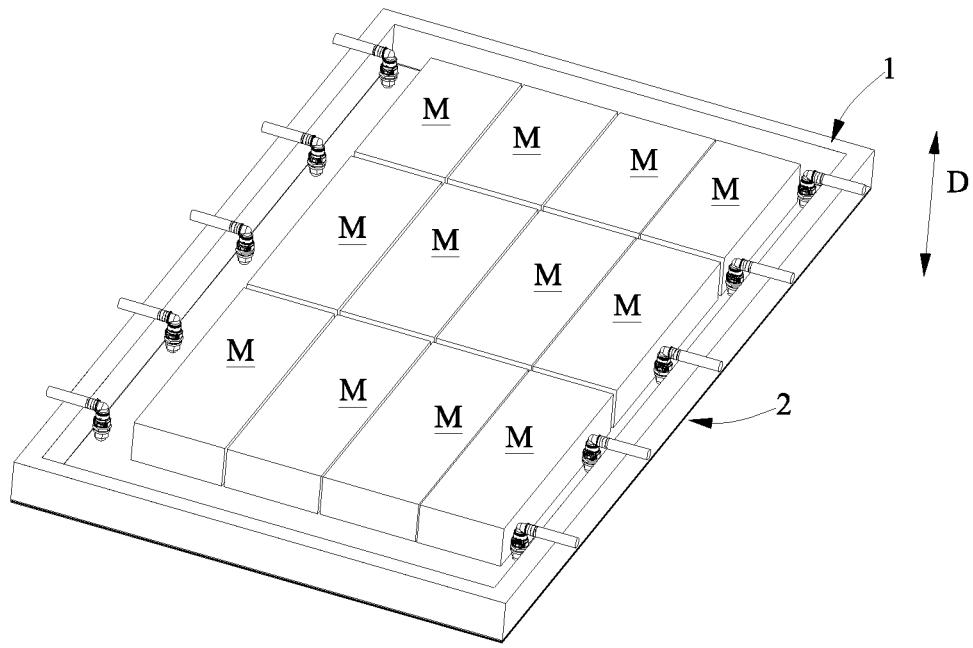
FIG. 1 is an assembled perspective view of a first embodiment of a battery box according to the present disclosure.

Reference numerals in figures are represented as follows:
M battery module
B battery
D up-down direction
1 lower frame body
2 heat exchange assembly
21 heat exchange plate
F flow passage
S211 outer side surface
U211 upper surface
L211 lower surface
211 upper plate
212 lower plate
22 heat insulating pad
221 first part
222 second part
223 third part
S221 outer side surface
23 temperature preserving pad
230 main body
231 protruding portion
232 extending portion
233 bending portion
234 folding-back portion
24 protective plate
241 peripheral portion
U241 upper surface
S241 outer side surface
242 recessed portion
25 fixing member

DETAILED DESCRIPTION

The appended figures illustrate embodiments of the present disclosure and it is to be understood that the disclosed embodiments are merely exemplary of the present disclosure, which may be embodied in various forms. Therefore, specific details disclosed herein are not to be interpreted as limiting, but merely as a basis for the claims and as a representative basis for teaching one skilled in the art to variously employ the present disclosure.

Additionally, expressions indicating directions such as up, down, left, right, front, and back that are used to describe the operation and configuration of each part in embodiments are relative and not absolute, and are suitable when each part is in the orientation illustrated by the drawings; however, when the orientation of each part is changed, then these expressions should be interpreted to change corresponding to the changes in orientation.

Figure 2:
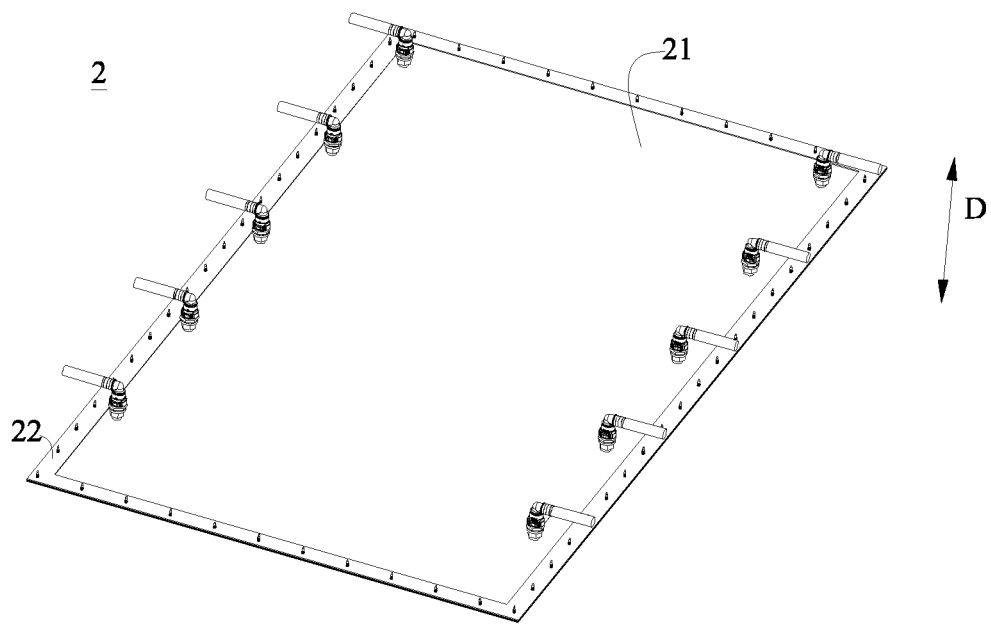
FIG. 2 is an assembled perspective view of a heat exchange assembly of the battery box of FIG. 1.
Figure 3:
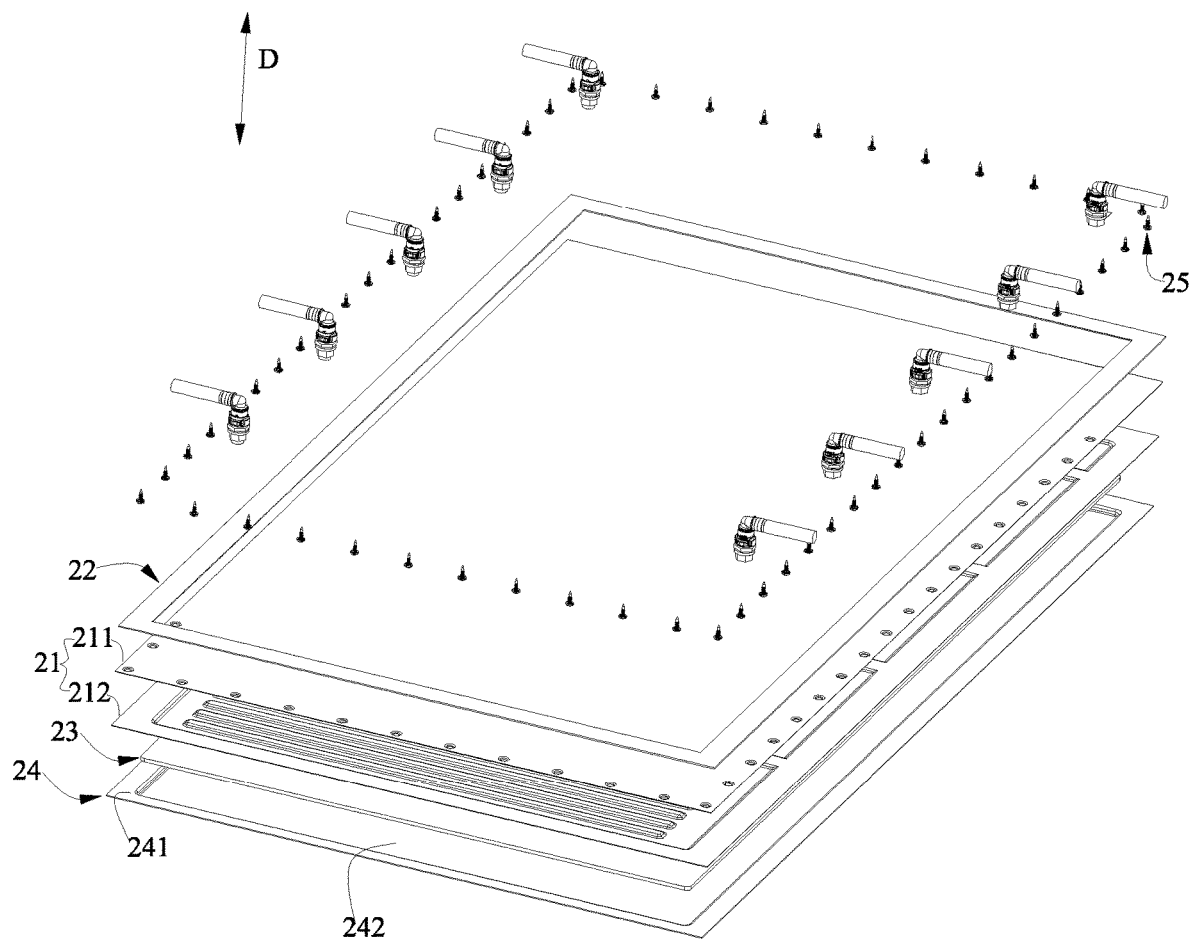
FIG. 3 is an exploded view of FIG. 2.
Figure 4:
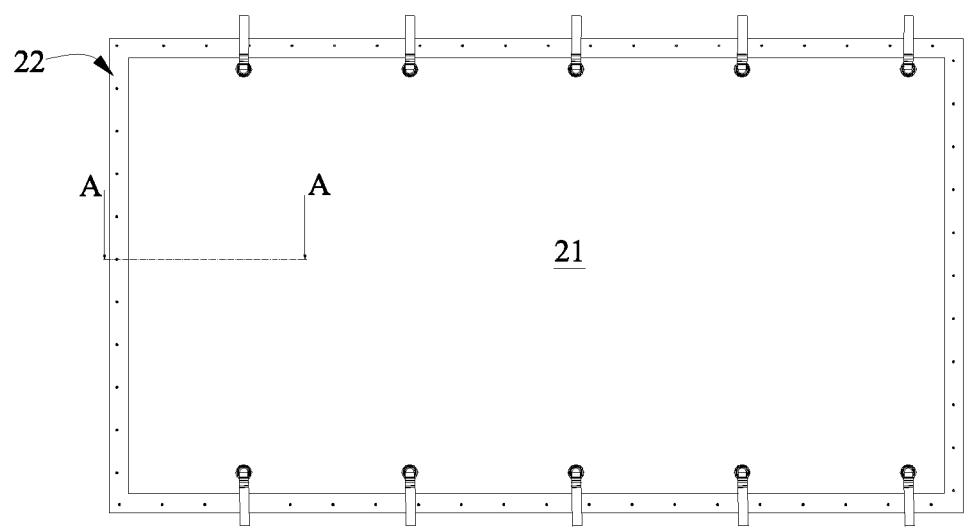
FIG. 4 is a top view of FIG. 2.
Figure 5:
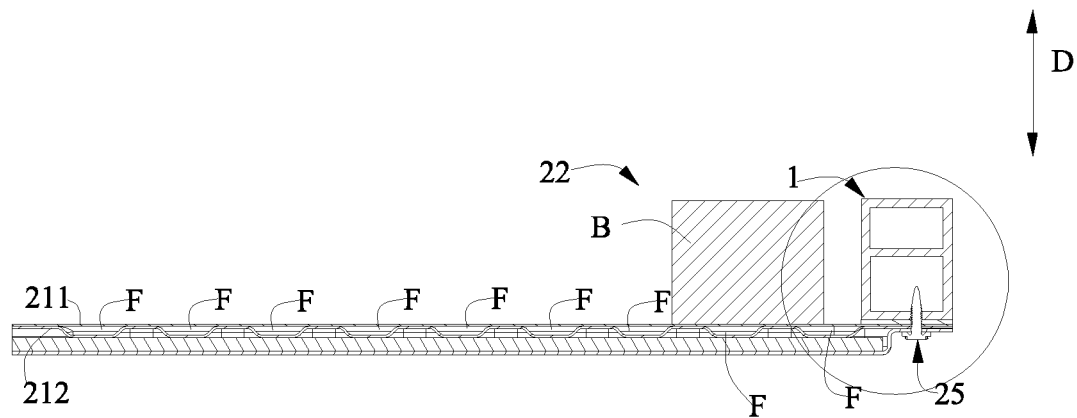
FIG. 5 is a partial cross-section view of FIG. 4.
Figure 6:
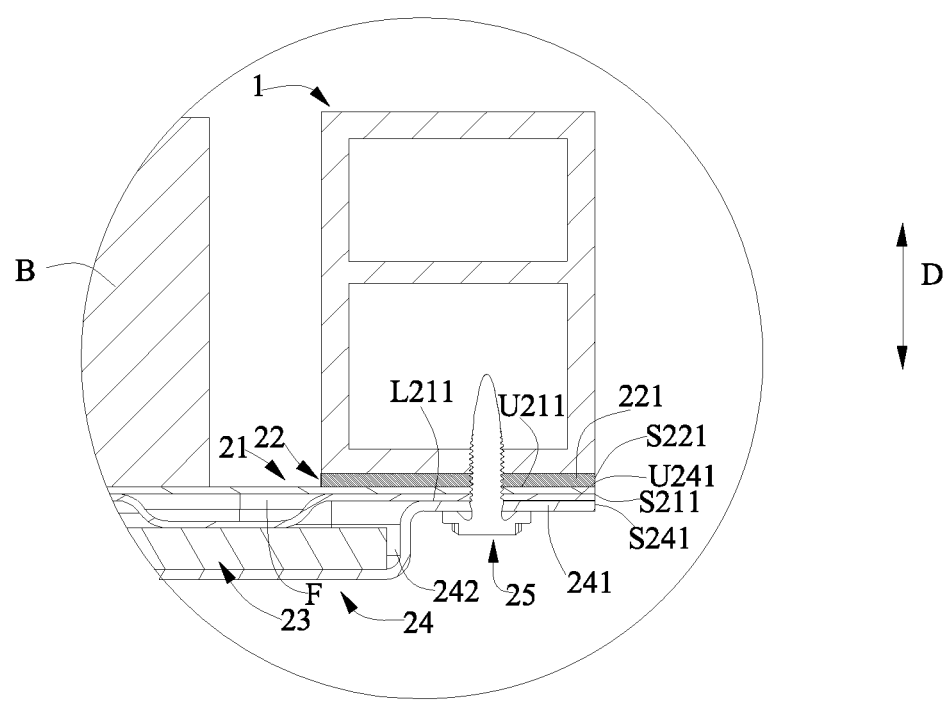
FIG. 6 is an enlarged view of FIG. 5 indicated by a circle.

FIG. 1 is an assembled perspective view of a first embodiment of a battery box according to the present disclosure. FIG. 2 is an assembled perspective view of a heat exchange assembly of the battery box of FIG. 1. FIG. 3 is an exploded view of FIG. 2. FIG. 4 is a top view of FIG. 2. FIG. 5 is a partial cross-section view of FIG. 4. FIG. 6 is an enlarged view of FIG. 5 indicated by a circle. FIG. 7 to FIG. 14 are enlarged views of second to ninth embodiments of the battery box according to the present disclosure.

A battery box according to the present disclosure comprises a lower frame body 1 and a heat exchange assembly 2.

A lower frame body 1 is closed in a circumferential direction and opened in an up-down direction D. The lower frame body 1 can be made of metal, such as aluminum alloy. The lower frame body 1 can be a die casting member or an extrusion profile.

The heat exchange assembly 2 is fixed below the lower frame body 1 at a circumferential edge of the heat exchange assembly 2, the heat exchange assembly 2 and the lower frame body 1 form an accommodating space which is opened upwardly and used to accommodate the battery B. The heat exchange assembly 2 comprises a heat exchange plate 21, a heat insulating pad 22, a temperature preserving pad 23 and a protective plate 24. The heat exchange assembly 2 further comprises a fixing member 25. The battery B is generally arranged in the form of a battery module, that is, a plurality of batteries B are arranged together to form a unit module. The battery B may generally comprise a case and an electrode assembly and an electrolyte which are received in the case. The electrode assembly comprises a positive electrode plate, a negative electrode plate and a separator. The battery B may be a can-type (or rigid case) battery, and accordingly, the case comprises a cap assembly and an outer case assembled with the cap assembly; or the battery B may be a pouch-type (or flexible case) battery, the case is made of a packaging film (such as an aluminum plastic film).

The heat exchange plate 21 is provided with a flow passage F therein for a heat exchange medium to flow, a portion of the heat exchange plate 21 provided with the flow passage F is used to support the battery B and exchange heat with the battery B. Specifically, the heat exchange plate 21 comprises an upper plate 211 and a lower plate 212. The upper plate 211 and the lower plate 212 enclose to form the flow passage F, for example by stamping the upper plate 211 and/or the lower plate 212. In order to improve the heat exchange effect, the heat exchange plate 21 is made of a material having high thermal conductivity, preferably a metal material, and more preferably an aluminum alloy material. The heat insulating pad 22 comprises a first part 221 having a ring shape, and the first part 221 surrounds an entire circumferential edge of the heat exchange plate 21 outside the flow passage F and is provided above an upper surface U211 of the circumferential edge of the heat exchange plate 21, the first part 221 of the heat insulating pad 22 and the circumferential edge of the heat exchange plate 21 are stacked in the up-down direction D, the first part 221 of the heat insulating pad 22 is sandwiched between a lower surface of the lower frame body 1 and the upper surface U211 of the circumferential edge of the heat exchange plate 21. Therefore, the heat transfer in the upward direction between the lower frame body 1 and the upper surface U211 of the circumferential edge of the heat exchange plate 21 is blocked, which improves the heat insulating effect to the heat exchange plate 21, and in turn improves the stability and constancy of the operating temperature of the battery B. A material of the heat insulating pad 22 may be a composite material, such as an epoxy resin pad, of course, it is not limited thereto, and any suitable pad having high heat insulating properties may be used.

At least a portion of the temperature preserving pad 23 is provided below the heat exchange plate 21, and the temperature preserving pad 23 at least covers the portion of the heat exchange plate 21 in which the flow passage F is provided. Therefore, at least the heat transfer of the heat exchange plate 21 in a downward direction is blocked, thereby preserving temperature of the battery B. A material of the temperature preserving pad 23 may be a heat insulating cotton, a foam or the like.

The protective plate 24 supports the temperature preserving pad 23 and the heat exchange plate 21 from below. A material of the protective plate 24 is preferably a material with strong impact resistance, such as aluminum alloy, stainless steel, high-strength steel, hot-dip (DP) galvanized bidirectional high-strength alloy steel, etc. Therefore, under the impact of an external force, the protective plate 24 prevents the heat exchange plate 21 from failure due to damage by the external force.

The heat insulating pad 22 can be configured in a variety of forms, which are specifically described below.

In the first embodiment shown in FIG. 6, the protective plate 24 comprises a peripheral portion 241 which is ring-shaped and a recessed portion 242 which is recessed downwardly from an inner side of the peripheral portion 241, the temperature preserving pad 23 is received in the recessed portion 242; the first part 221 of the heat insulating pad 22, the circumferential edge of the heat exchange plate 21 and the peripheral portion 241 of the protective plate 24 are stacked in the up-down direction D; an outer side surface S221 of the first part 221 of the heat insulating pad 22, an outer side surface S211 of the circumferential edge of the heat exchange plate 21 and an outer side surface S241 of the peripheral portion 241 of the protective plate 24 are flush with each other. The flush arrangement helps to improve the aesthetics of the appearance of the battery box.

Figure 7:
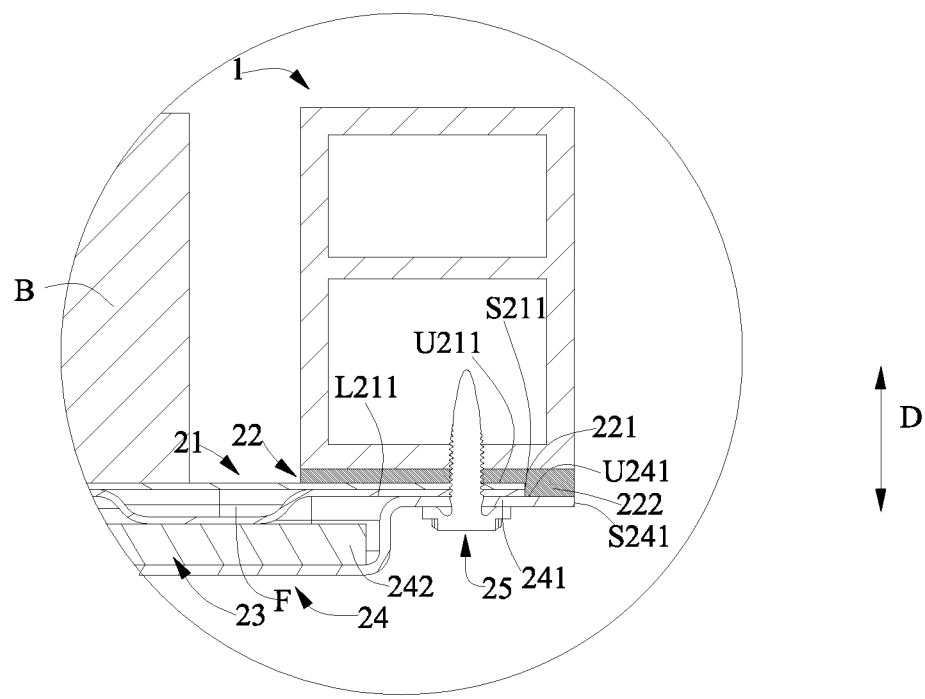
FIG. 7 is an enlarged view of a second embodiment of the battery box according to the present disclosure corresponding to FIG. 6.

In the second embodiment shown in FIG. 7, the protective plate 24 comprises a peripheral portion 241 which is ring-shaped and a recessed portion 242 which recessed downwardly from an inner side of the peripheral portion 241, the temperature preserving pad 23 is received in the recessed portion 242; an outer side surface S241 of the peripheral portion 241 of the protective plate 24 protrudes outwardly with respect to an outer side surface S211 of the circumferential edge of the heat exchange plate 21; the heat insulating pad 22 further comprises a second part 222, the second part 222 bends downwardly from the first part 221 and extends to surround the outer side surface S211 of the circumferential edge of the heat exchange plate 21 from outside. Therefore, heat insulating from outside (i.e., along the circumferential direction and the radial direction) the outer side surface S211 of the circumferential edge of the heat exchange plate 21 is performed by the second part 222 of the heat insulating pad 22, thereby reinforcing the heat insulating on the basis of the first portion 221, in turn improving the heat insulating effect to the heat exchange plate 21, and improving the stability and constancy of the operating temperature of the battery B. Furthermore, the outer side surface S211 is also protected against damage caused by direct impact on the outer side surface S211.

Figure 8:
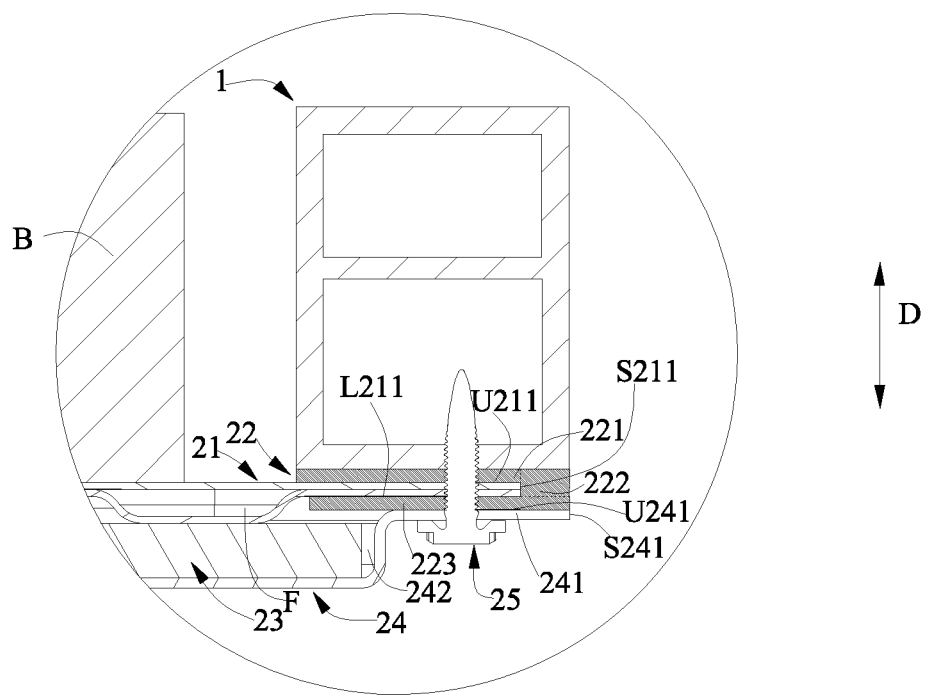
FIG. 8 is an enlarged view of a third embodiment of the battery box according to the present disclosure corresponding to FIG. 7.

In the third embodiment shown in FIG. 8, on the basis of the second embodiment shown in FIG. 7, the heat insulating pad 22 further comprises a third part 223, the third part 223 bends inwardly from the second part 222 and extends to below a lower surface L211 of the circumferential edge of the heat exchange plate 21, the third part 223 is sandwiched by an upper surface U241 of the peripheral portion 241 of the protective plate 24 and the lower surface L211 of the circumferential edge of the heat exchange plate 21 in the up-down direction D. Therefore, it can not only strengthen the fixing of the second part 222, but also insulate heat from below the lower surface L211 of the circumferential edge of the heat exchange plate 21, so that the third part 223, the first part 221 and the second part 222 together achieve multi-directional heat insulation in the upward, downward, circumferential and radial directions, which further improves the temperature control effect of the battery box, and improves the stability and constancy of the operating temperature of the battery B. Furthermore, the outer side surface S211 of the circumferential edge of the heat exchange plate 21 is wrapped by the first part 221, the second part 222 and the third part 223 of the heat insulating pad 22, which improves the buffer effect of the circumferential edge of the heat exchange plate 21.

Figure 9:
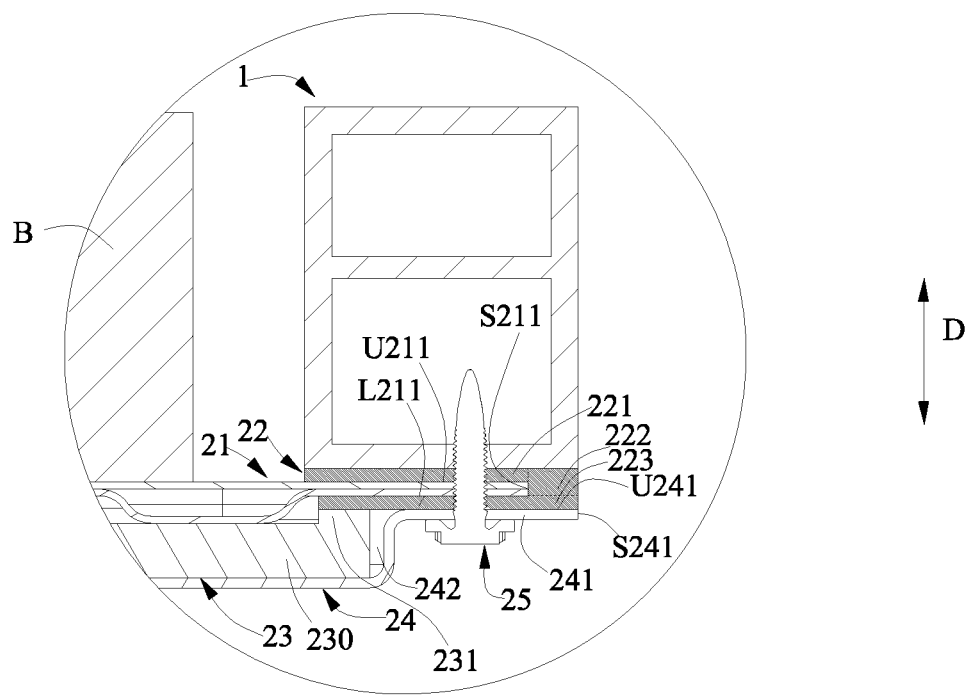
FIG. 9 is an enlarged view of a fourth embodiment of the battery box according to the present disclosure corresponding to FIG. 7.

In the fourth embodiment shown in FIG. 9, on the basis of the second embodiment shown in FIG. 7, the heat insulating pad 22 further comprises a third part 223, the third part 223 bends inwardly from the second part 222, extends to below a lower surface L211 of the circumferential edge of the heat exchange plate 21 and further extends into the recessed portion 242 of the protective plate 24, the temperature preserving pad 23 comprises a main body 230 and a protruding portion 231 which is ring-shaped and protrudes upwardly from the main body 230, and the protruding portion 231 and a portion of the third part 223 which is located in the recessed portion 242 of the protective plate 24 abut against each other in the up-down direction D. It is noted that the fourth embodiment shown in FIG. 9 is similar to the third embodiment shown in FIG. 8, but differs in the extension extent of the heat insulating pad 22 and the protruding portion 231 of the temperature preserving pad 23. The protruding portion 231 and the portion of the third part 223 of the heat insulating pad 22 which is located in the recessed portion 242 of the protective plate 24 abut against each other in the up-down direction D, the heat insulating pad 22 and the temperature preserving pad 23 are connected together, so that the first part 221, the second part 222, the third part 223 and the temperature preserving pad 23 together achieve multi-directional heat insulation to the entire heat exchange plate 21 in the upward, downward, circumferential and radial directions (not only achieve the heat insulation from the lower frame body 1 but also from the protective plate 24), and further improve the temperature control effect of the battery box, and improve the stability and constancy of the operating temperature of the battery B.

The temperature preserving pad 23 can be configured in a variety of forms, which are specifically described below.

Figure 10:
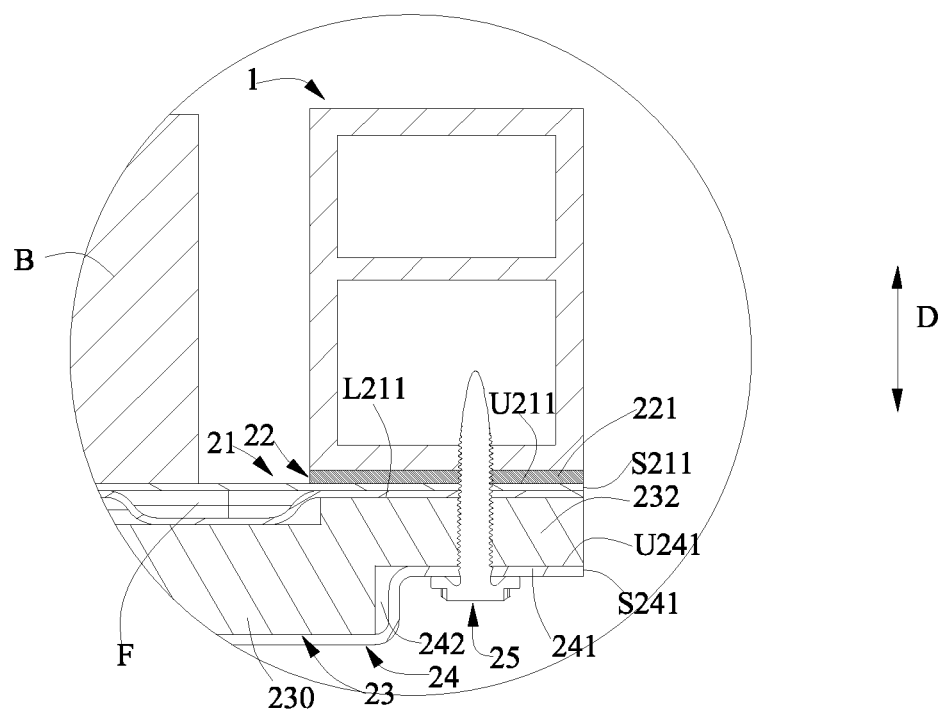
FIG. 10 is an enlarged view of a fifth embodiment of the battery box according to the present disclosure corresponding to FIG. 6.

In the fifth embodiment shown in FIG. 10, the protective plate 24 comprises a peripheral portion 241 which is ring-shaped and a recessed portion 242 which is recessed downwardly from an inner side of the peripheral portion 241; the temperature preserving pad 23 comprises a main body 230 and an extending portion 232, the main body 230 is received in the recessed portion 242, the extending portion 232 extends outwardly from the main body 230 onto an entire lower surface L211 of the circumferential edge of the heat exchange plate 21 so that the extending portion 232 is sandwiched between an upper surface U241 of the peripheral portion 241 of the protective plate 24 and the lower surface L211 of the circumferential edge of the heat exchange plate 21. The fifth embodiment shown in FIG. 10 is similar to the third embodiment shown in FIG. 8, the extending portion 232 can perform temperature preservation from below the lower surface L211 of the circumferential edge of the heat exchange plate 21, so that the extending portion 232 and the first part 221 of the heat insulating pad 22 together realize bidirectional heat insulation in the up-down direction D, which improves the temperature control effect of the battery box, and improves the stability and constancy of the operating temperature of the battery B.

Figure 11:
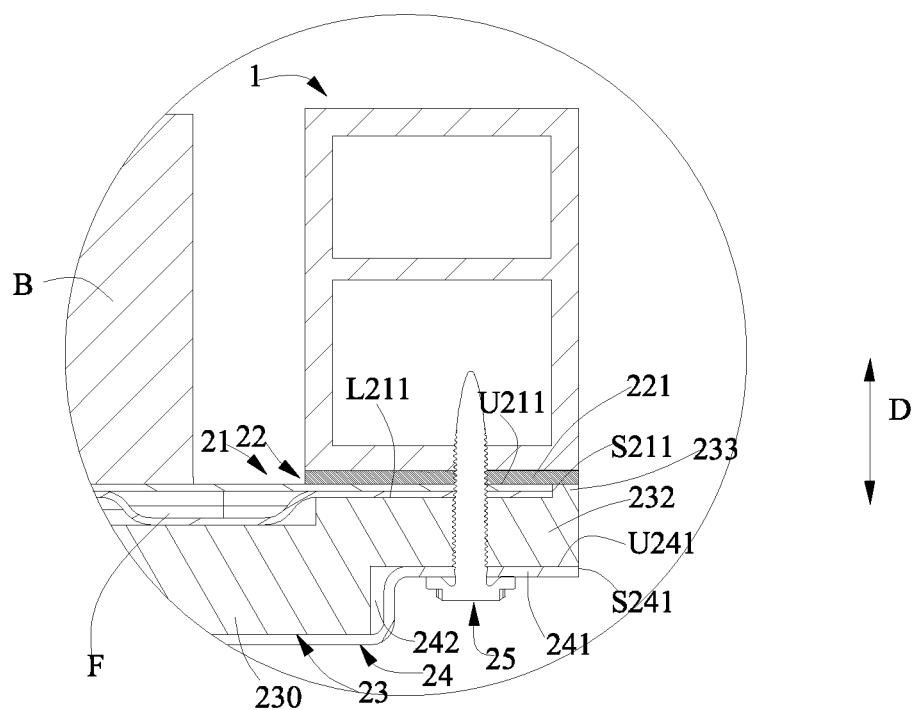
FIG. 11 is an enlarged view of a sixth embodiment of the battery box according to the present disclosure corresponding to FIG. 10.

In the sixth embodiment shown in FIG. 11, the protective plate 24 comprises a peripheral portion 241 which is ring-shaped and a recessed portion 242 which recessed downwardly from an inner side of the peripheral portion 241, an outer side surface S241 of the peripheral portion 241 of the protective plate 24 protrudes outwardly with respect to an outer side surface S211 of the circumferential edge of the heat exchange plate 21; the temperature preserving pad 23 comprises a main body 230, an extending portion 232 and a bending portion 233, the main body 230 is received in the recessed portion 242, the extending portion 232 extends outwardly from the main body 230 onto the lower surface L211 of the circumferential edge of the heat exchange plate 21 so that the extending portion 232 is sandwiched between an upper surface U241 of the peripheral portion 241 of the protective plate 24 and the lower surface L211 of the circumferential edge of the heat exchange plate 21, the bending portion 233 bends upwardly from the extending portion 232 and extends to surround the outer side surface S211 of the circumferential edge of the heat exchange plate 21. The sixth embodiment shown in FIG. 11 can achieve an effect similar to that of the third embodiment shown in FIG. 8, that is, the bending portion 233 of the temperature preserving pad 23 insulates heat from outside (i.e., the circumferential direction and the radial direction) the outer side surface S211 of the circumferential edge of the heat exchange plate 21, so that the extending portion 232 and the bending portion 233 of the temperature preserving pad 23 and the first part 221 of the heat insulating pad 22 together realize multi-directional heat insulation in the upward, downward, circumferential and radial directions, thereby further improving the temperature control effect of the battery box, and improving the stability and constancy of the operating temperature of battery B. Furthermore, the sixth embodiment shown in FIG. 11 can also have an effect similar to that of the fourth embodiment shown in FIG. 9, the main body 230, the extending portion 232 and the bending portion 233 (in other words, the entire thermal insulation pad 23) of the temperature preserving pad 23 and the first part 221 of the heat insulating pad 22 together realize multi-directional heat insulation to the entire heat exchange plate 21 in the upward, downward, circumferential and radial directions (realize not only the heat insulation between the heat exchange plate 21 and the lower frame body 1, but also temperature preservation (that is heat insulation) between the heat exchange plate 21 and the protective plate 24), and further improve the temperature control effect of the battery box, improve the stability and constancy of the operating temperature of the battery B. In the seventh embodiment shown in FIG. 12, on the basis of the sixth embodiment shown in FIG. 11, the temperature preserving pad 23 further comprises a folding-back portion 234, the folding-back portion 234 bends inwardly from the bending portion 233 and extends to the upper surface U211 of the circumferential edge of the heat exchange plate 21. The folding-back portion 234 facilitates the fixing of the bending portion 233, while forming the double-layer heat insulation over the upper surface U211 of the circumferential edge of the heat exchange plate 21, thereby reinforcing the heat insulating effect between the heat exchange plate 21 and the lower frame 1 in the upward direction.

Figure 12:
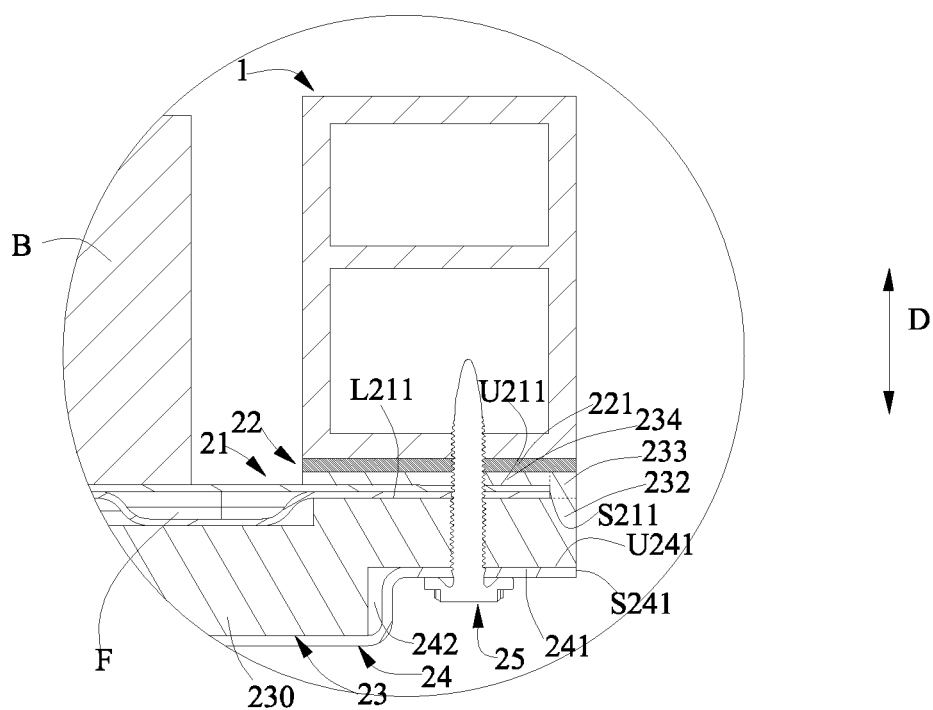
FIG. 12 is an enlarged view of a seventh embodiment of the battery box according to the present disclosure corresponding to FIG. 11.

A positional relationship of the folding-back portion 234 and the first part 221 of the heat insulating pad 22 may be as shown in FIG. 12, that is, the folding-back portion 234 of the temperature preserving pad 23 is sandwiched between the first part 221 of the heat insulating pad 22 and the upper surface U211 of the circumferential edge of the heat exchange plate 21.

Figure 13:
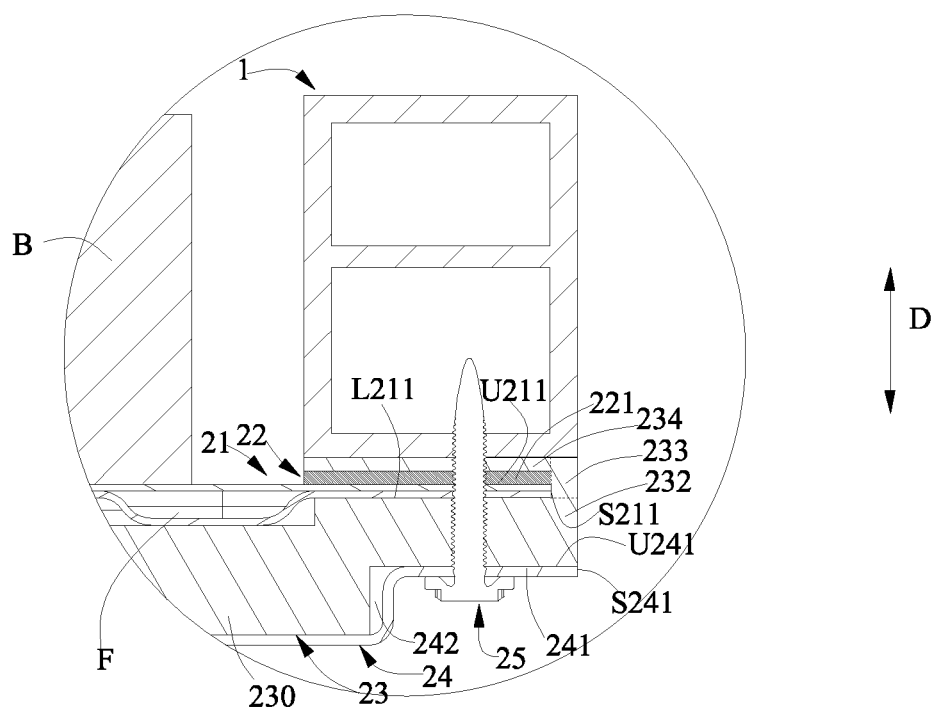
FIG. 13 is an enlarged view of an eighth embodiment of the battery box according to the present disclosure corresponding to FIG. 12.

A positional relationship of the folding-back portion 234 and the first part 221 of the heat insulating pad 22 may also be as shown in FIG. 13. In the eighth embodiment shown in FIG. 13, the first part 221 of the heat insulating pad 22 is sandwiched between the folding-back portion 234 of the temperature preserving pad 23 and the upper surface U211 of the circumferential edge of the heat exchange plate 21.

Figure 14:
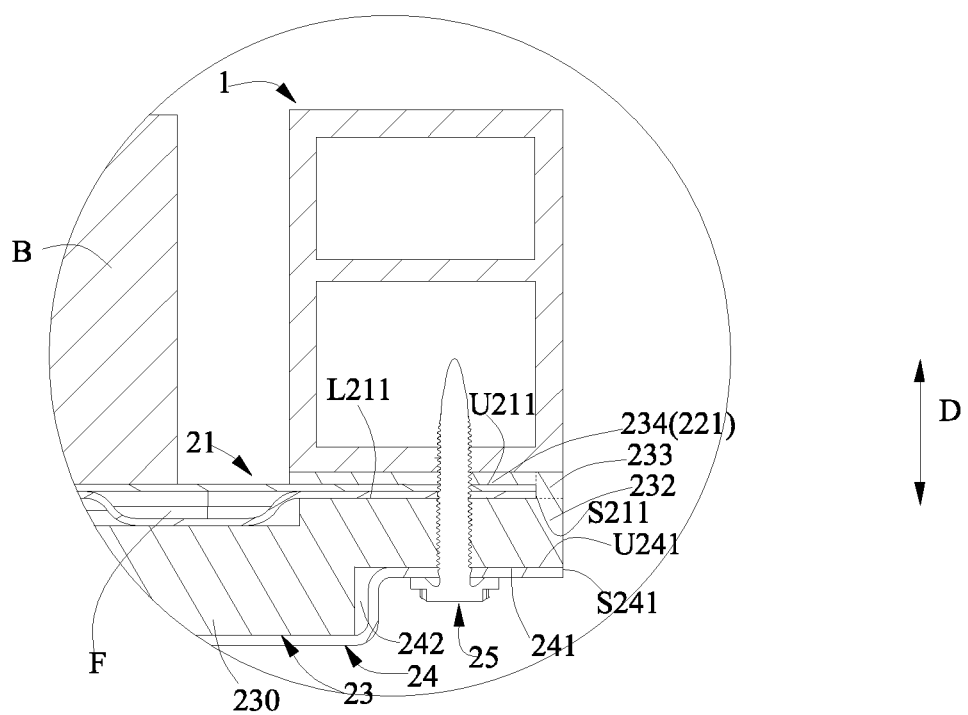
FIG. 14 is an enlarged view of a ninth embodiment of the battery box according to the present disclosure corresponding to FIG. 9 and FIG. 11.

In the ninth embodiment shown in FIG. 14, the fourth embodiment shown in FIG. 9 and the sixth embodiment shown in FIG. 11, the temperature preserving pad 23 and the heat insulating pad 22 are integrally formed. In other words, the temperature preserving pad 23 and the heat insulating pad 22 can be made of the same material, thereby saving manufacturing cost. More specifically, the first part 221 of the heat insulating pad 22 is formed by the folding-back portion 234 of the temperature preserving pad 23, and vice versa, that is, other portions, such as the extending portion 232 and the bending portion 233. In the fourth embodiment shown in FIG. 9 and in the sixth embodiment shown in FIG. 11, the temperature preserving pad 23 and the heat insulating pad 22 are formed separately.

A fixing member 25 is used to fix the heat exchange plate 21, the heat insulating pad 22, the temperature preserving pad 23 and the protective plate 24 to the lower frame body 1. The fixing member 25 can take any suitable form, such as a rivet or a combination of bolt and nut. The material of the fixing member 25 is preferably made of a material having low thermal conductivity, such as a plastic member.

The above detailed description describes various exemplary embodiments, but is not intended to be limited to the specifically disclosed combinations. Therefore, unless otherwise stated, the various features disclosed herein can be combined together to form a plurality of additional combinations that are not shown for the sake of clarity.

What is claimed is:

1. A battery box, comprising:
a lower frame body closed in a circumferential direction and opened in an up-down direction; and
a heat exchange assembly fixed below the lower frame body at a circumferential edge of the heat exchange assembly, the heat exchange assembly and the lower frame body forming an accommodating space which is opened upwardly and used to accommodate a battery, the heat exchange assembly comprising a heat exchange plate, a heat insulating pad, a temperature preserving pad and a protective plate;
wherein
the heat exchange plate is provided with a flow passage therein for a heat exchange medium to flow, a portion of the heat exchange plate provided with the flow passage is used to support the battery and exchange heat with the battery;
the heat insulating pad comprises a first part, the first part has a ring shape, the first part surrounds an entire circumferential edge of the heat exchange plate outside the flow passage and is provided above an upper surface of the circumferential edge of the heat exchange plate, the first part of the heat insulating pad and the circumferential edge of the heat exchange plate are stacked in the up-down direction, the first part of the heat insulating pad is sandwiched between a lower surface of the lower frame body and the upper surface of the circumferential edge of the heat exchange plate;
at least a portion of the temperature preserving pad is provided below the heat exchange plate, and the temperature preserving pad at least covers the portion of the heat exchange plate in which the flow passage is provided;
the protective plate supports the temperature preserving pad and the heat exchange plate from below.

2. The battery box according to claim 1, wherein
the protective plate comprises a peripheral portion which is ring-shaped and a recessed portion which is recessed downwardly from an inner side of the peripheral portion, the temperature preserving pad is received in the recessed portion;
the first part of the heat insulating pad, the circumferential edge of the heat exchange plate and the peripheral portion of the protective plate are stacked in the up-down direction;
an outer side surface of the first part of the heat insulating pad, an outer side surface of the circumferential edge of the heat exchange plate and an outer side surface of the peripheral portion of the protective plate are flush with each other.

3. The battery box according to claim 1, wherein
the protective plate comprises a peripheral portion which is ring-shaped and a recessed portion which recessed downwardly from an inner side of the peripheral portion, the temperature preserving pad is received in the recessed portion;
an outer side surface of the peripheral portion of the protective plate protrudes outwardly with respect to an outer side surface of the circumferential edge of the heat exchange plate;
the heat insulating pad further comprises a second part, the second part bends downwardly from the first part and extends to surround the outer side surface of the circumferential edge of the heat exchange plate from outside.

4. The battery box according to claim 3, wherein
the heat insulating pad further comprises a third part;
the third part bends inwardly from the second part and extends to below a lower surface of the circumferential edge of the heat exchange plate, the third part is sandwiched by an upper surface of the peripheral portion of the protective plate and the lower surface of the circumferential edge of the heat exchange plate in the up-down direction.

5. The battery box according to claim 3, wherein
the heat insulating pad further comprises a third part, the third part bends inwardly from the second part, extends to below a lower surface of the circumferential edge of the heat exchange plate and further extends into the recessed portion of the protective plate;
the temperature preserving pad comprises a main body and a protruding portion which is ring-shaped and protrudes upwardly from the main body, and the protruding portion and a portion of the third part which is located in the recessed portion of the protective plate abut against each other in the up-down direction.

6. The battery box according to claim 5, wherein
the temperature preserving pad and the heat insulating pad are integrally formed.

7. The battery box according to claim 1, wherein,
the protective plate comprises a peripheral portion which is ring-shaped and a recessed portion which is recessed downwardly from an inner side of the peripheral portion;
the temperature preserving pad comprises a main body and an extending portion, the main body is received in the recessed portion, the extending portion extends outwardly from the main body onto an entire lower surface of the circumferential edge of the heat exchange plate so that the extending portion is sandwiched between an upper surface of the peripheral portion of the protective plate and the lower surface of the circumferential edge of the heat exchange plate.

8. The battery box according to claim 1, wherein
the protective plate comprises a peripheral portion which is ring-shaped and a recessed portion which recessed downwardly from an inner side of the peripheral portion;
an outer side surface of the peripheral portion of the protective plate protrudes outwardly with respect to an outer side surface of the circumferential edge of the heat exchange plate;
the temperature preserving pad comprises a main body, an extending portion and a bending portion, the main body is received in the recessed portion, the extending portion extends outwardly from the main body onto a lower surface of the circumferential edge of the heat exchange plate so that the extending portion is sandwiched between an upper surface of the peripheral portion of the protective plate and the lower surface of the circumferential edge of the heat exchange plate, the bending portion bends upwardly from the extending portion and extends to surround the outer side surface of the circumferential edge of the heat exchange plate.

9. The battery box according to claim 8, wherein
the temperature preserving pad further comprises a folding-back portion, the folding-back portion bends inwardly from the bending portion and extends to the upper surface of the circumferential edge of the heat exchange plate.

10. The battery box according to claim 9, wherein
the folding-back portion of the temperature preserving pad is sandwiched between the first part of the heat insulating pad and the upper surface of the circumferential edge of the heat exchange plate.

11. The battery box according to claim 9, wherein
the first part of the heat insulating pad is sandwiched between the folding-back portion of the temperature preserving pad and the upper surface of the circumferential edge of the heat exchange plate.

12. The battery box according to claim 9, wherein
the temperature preserving pad and the heat insulating pad are integrally formed.

13. The battery box according to claim 8, wherein
the temperature preserving pad and the heat insulating pad are integrally formed.

* * * * *